(12) United States Patent
Zelesky et al.

(10) Patent No.: US 9,243,500 B2
(45) Date of Patent: Jan. 26, 2016

(54) TURBINE BLADE PLATFORM WITH U-CHANNEL COOLING HOLES

(75) Inventors: Mark F. Zelesky, Bolton, CT (US); Ricardo Trindade, Coventry, CT (US); Bret M. Teller, Meriden, CT (US); Scott D. Lewis, Vernon, CT (US); Jeffrey S. Beattie, South Glastonbury, CT (US); Jeffrey Michael Jacques, East Hartford, CT (US); Brandon M. Rapp, West Hartford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 795 days.

(21) Appl. No.: 13/537,258

(22) Filed: Jun. 29, 2012

(65) Prior Publication Data

US 2014/0000282 A1    Jan. 2, 2014

(51) Int. Cl.
*F01D 5/18* (2006.01)
*F01D 5/08* (2006.01)

(52) U.S. Cl.
CPC ............... *F01D 5/085* (2013.01); *F01D 5/081* (2013.01); *F01D 5/18* (2013.01); *F05D 2240/81* (2013.01); *Y02T 50/676* (2013.01)

(58) Field of Classification Search
CPC ...................................................... F01D 5/081
See application file for complete search history.

(56) References Cited

U.S. PATENT DOCUMENTS

| | | |
|---|---|---|
| 5,800,124 A | 9/1998 | Czelesky |
| 6,331,097 B1 | 12/2001 | Jendrix |
| 6,428,270 B1 | 8/2002 | Leone et al. |
| 6,923,616 B2 | 8/2005 | McRae, Jr. et al. |
| 7,244,101 B2 | 7/2007 | Lee et al. |
| 7,503,748 B2 | 3/2009 | Ferra et al. |
| 2005/0201857 A1* | 9/2005 | Ferra et al. ............. 415/115 |
| 2007/0134099 A1 | 6/2007 | Lee et al. |
| 2007/0140848 A1 | 6/2007 | Charbonneau et al. |
| 2011/0129342 A1 | 6/2011 | Smoke et al. |
| 2012/0034102 A1 | 2/2012 | Boyer |
| 2012/0070305 A1 | 3/2012 | Ammann et al. |

FOREIGN PATENT DOCUMENTS

| | | | |
|---|---|---|---|
| EP | 0801208 | | 12/2002 |
| GB | 2467350 A | * | 8/2010 |

OTHER PUBLICATIONS

International Preliminary Report on Patentability for International Application No. PCT/US2013/043340 mailed Jan. 8, 2015.
International Search Report and Written Opinion for International Application No. PCT/US2013/043340 completed on Nov. 13, 2013.
EP Search Report for Application No. 13810147.2 dated Jun. 8, 2015.

* cited by examiner

*Primary Examiner* — Richard Edgar
(74) *Attorney, Agent, or Firm* — Carlson, Gaskey & Olds, P.C.

(57) ABSTRACT

A turbine blade for a gas turbine engine includes an airfoil including leading and trailing edges joined by spaced apart pressure and suction sides to provide an exterior airfoil surface extending in a radial direction. The trailing edge is arranged on an aft side of the turbine blade. A root supports a platform from which the airfoil extends and a cooling passage extends within the root in the radial direction to the airfoil. A lower wing is arranged beneath the platform on the aft side and extends in an axial direction to provide a U-shaped channel with the platform that extends in a circumferential direction. An impingement hole extends from the U-channel to the cooling passage.

15 Claims, 4 Drawing Sheets

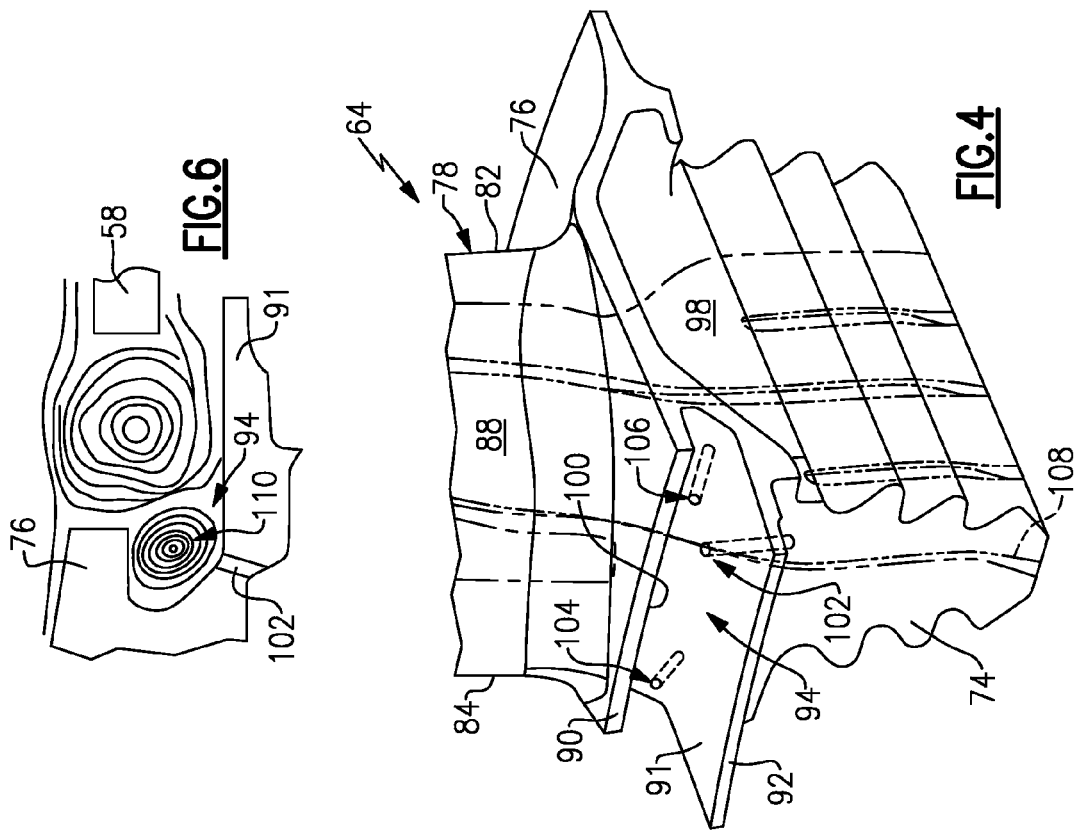
FIG.6
FIG.4
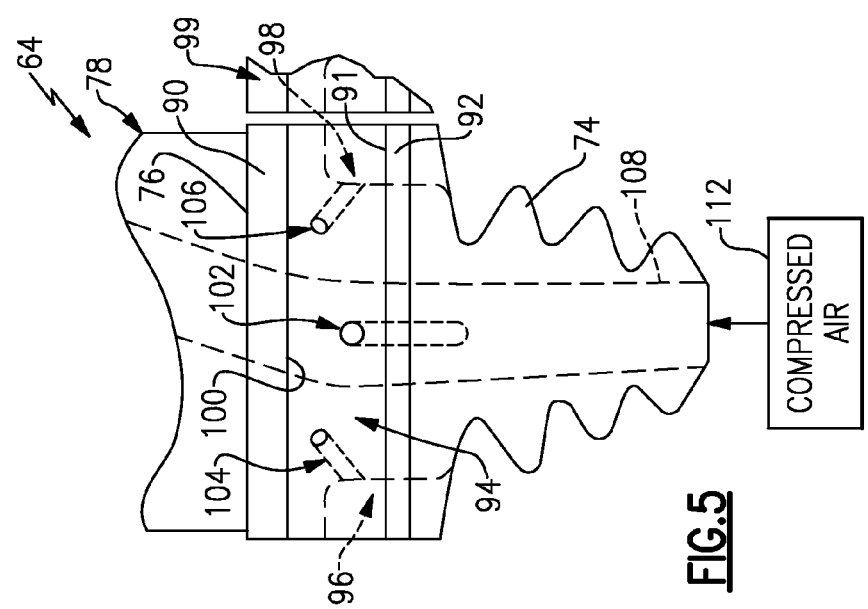
FIG.5

US 9,243,500 B2

TURBINE BLADE PLATFORM WITH U-CHANNEL COOLING HOLES

BACKGROUND

This disclosure relates to a turbine blade for a gas turbine engine. In particular, the disclosure relates to a turbine blade having a platform with a U-channel.

Some gas turbine engines include high and low pressure turbine sections on separate spools. A type of turbine blade in the high pressure section may include a platform and a lower wing forming a U-channel. The platform supports an airfoil. The U-channel reduces the stress in the area of a trailing edge of the airfoil.

A platform of an adjacent turbine rotor disk interleaves with the U-channel. Typically, air is delivered to the region between the adjacent rotor disks to provide cooling. However, the air provided in such cooling schemes does not always reached the U-channel. For example, the cooling air must turn forward or upstream to travel around the lower wing and reach the U-channel. Additionally, cooling air delivered to the cavity has a tendency to escape between the remaining faces of adjoining vanes due to the interaction of the vane platform with the U-channel.

SUMMARY

In one exemplary embodiment, a turbine blade for a gas turbine engine includes an airfoil including leading and trailing edges joined by spaced apart pressure and suction sides to provide an exterior airfoil surface extending in a radial direction. The trailing edge is arranged on an aft side of the turbine blade. A root supports a platform from which the airfoil extends and a cooling passage extends within the root in the radial direction to the airfoil. A lower wing is arranged beneath the platform on the aft side and extends in an axial direction to provide a U-shaped channel with the platform that extends in a circumferential direction. An impingement hole extends from the U-channel to the cooling passage.

In a further embodiment of any of the above, the lower wing extends axially beyond the platform. The U-channel faces aft.

In a further embodiment of any of the above, the impingement hole is oriented generally in a radial direction.

In a further embodiment of any of the above, the impingement hole is configured to direct fluid on an underside of the platform.

In a further embodiment of any of the above, the impingement hole has a diameter of 0.010 inch to 0.075 inch (0.25 mm to 1.91 mm).

In a further embodiment of any of the above, the impingement hole is configured to create a vortex within the U-channel.

In a further embodiment of any of the above, the root includes laterally spaced apart pressure and suction sides respectively having a pressure and suction side pocket. The turbine blade includes a first hole fluidly connecting one of the pressure and suction side pockets to the U-channel.

In a further embodiment of any of the above, the turbine blade includes a second hole fluidly connecting the U-channel to the other of the pressure and suction side pockets.

In a further embodiment of any of the above, the first hole includes a diameter of 0.010 inch to 0.075 inch (0.25 mm to 1.91 mm).

In another exemplary embodiment, a method of cooling a turbine blade for a gas turbine engine includes the steps of providing a U-channel at an aft side of a turbine blade and adjoining a platform, supplying a cooling fluid to a cooling passage arranged internal to the turbine blade, routing the cooling fluid to the U-channel, and impinging the cooling fluid onto a surface of the U-channel.

In a further embodiment of any of the above, the impinging step includes directing the cooling fluid onto an underside of the platform.

In a further embodiment of any of the above, the impinging step creates a vortex within the U-channel.

In a further embodiment of any of the above, the method includes the step of fluidly connecting the U-channel to a pocket arranged on a lateral side of the turbine blade.

In a further embodiment of any of the above, the method includes the step of fluidly connecting another pocket on an opposite lateral side of the turbine blade to the U-channel.

In a further embodiment of any of the above, the routing step includes fluidly connecting the U-channel to the cooling passage with a hole having a diameter of about 0.025 inch (0.64 mm).

In another exemplary embodiment, a gas turbine engine includes a compressor section. A combustor is fluidly connected to the compressor section. A turbine section is fluidly connected to the combustor. The turbine section includes a high pressure turbine coupled to the high pressure compressor via a shaft. The turbine section includes a low pressure turbine. The high pressure turbine includes an array of turbine blades. Each turbine blade includes an airfoil that includes leading and trailing edges joined by spaced apart pressure and suction sides to provide an exterior airfoil surface extending in a radial direction, the trailing edge arranged on an aft side of the turbine blade. A root supports a platform from which the airfoil extends. A cooling passage extends within the root in the radial direction to the airfoil. A lower wing is arranged beneath the platform on the aft side and extends in an axial direction to provide a U-shaped channel with the platform that extends in a circumferential direction. An impingement hole extends from the U-channel to the cooling passage.

In a further embodiment of any of the above, the compressor section is fluidly connected to the cooling passage and is configured to provide a cooling fluid to the impingement hole.

In a further embodiment of any of the above, the high pressure turbine includes multiple fixed vane arrays. The array of turbine blades are arranged between the fixed vane arrays.

In a further embodiment of any of the above, the array of turbine blades corresponds to a first stage array of turbine blades.

In a further embodiment of any of the above, the array of turbine blades includes circumferentially adjacent blades. Each of the turbine blades has a lateral side with a pocket, and includes a hole that fluidly connects the U-channel to each pocket.

BRIEF DESCRIPTION OF THE DRAWINGS

The disclosure can be further understood by reference to the following detailed description when considered in connection with the accompanying drawings wherein:

FIG. 4 is a perspective view of a lower portion a turbine blade, including a platform providing a U-channel.

FIG. 5 is an aft view of the turbine blade shown in FIG. 4.

FIG. 6 is a side view of the turbine blade in the area of the U-channel illustrating a resultant vortex.

DETAILED DESCRIPTION

Figure 1:
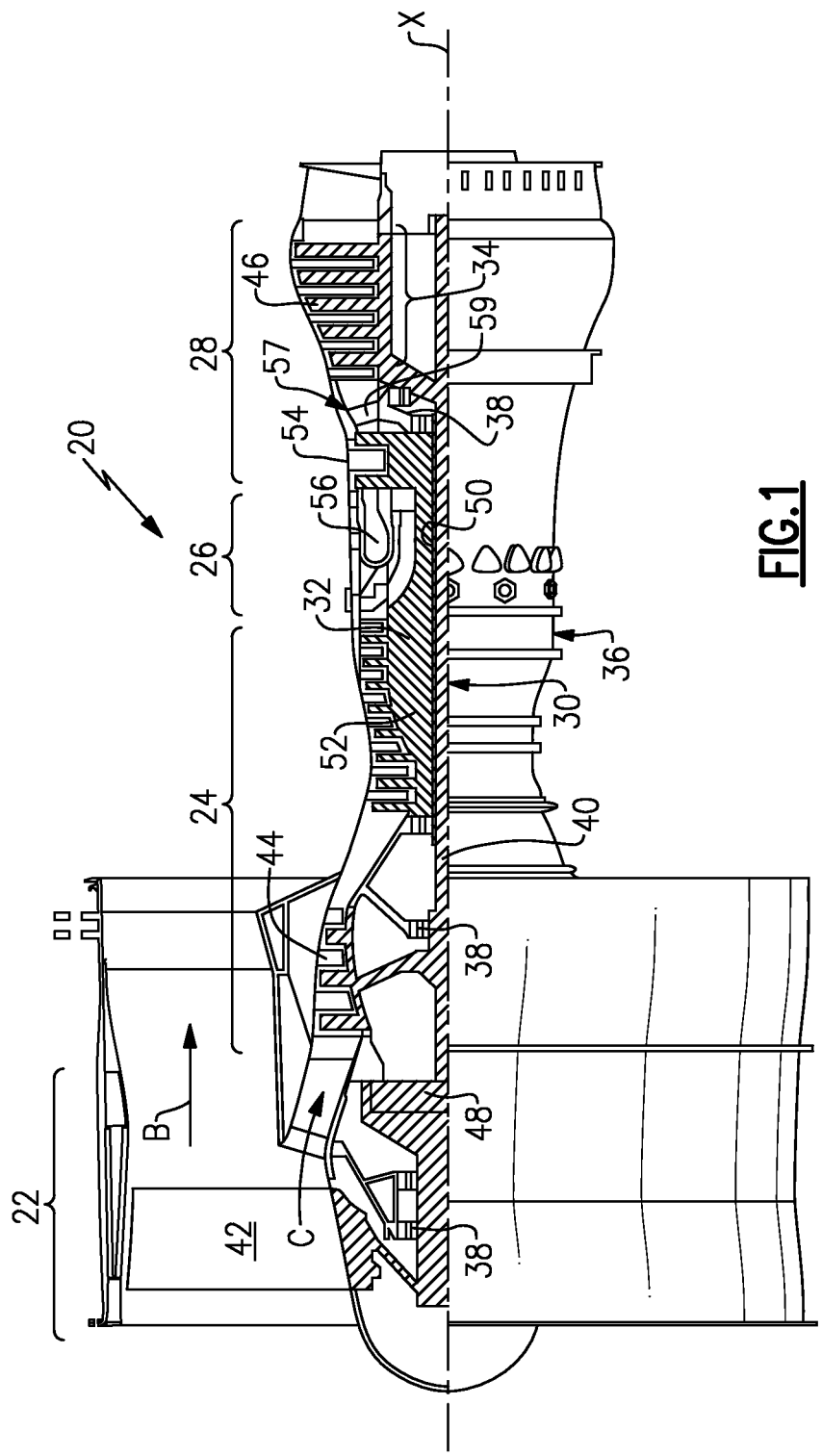
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram °R)/518.7) 0.5]. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
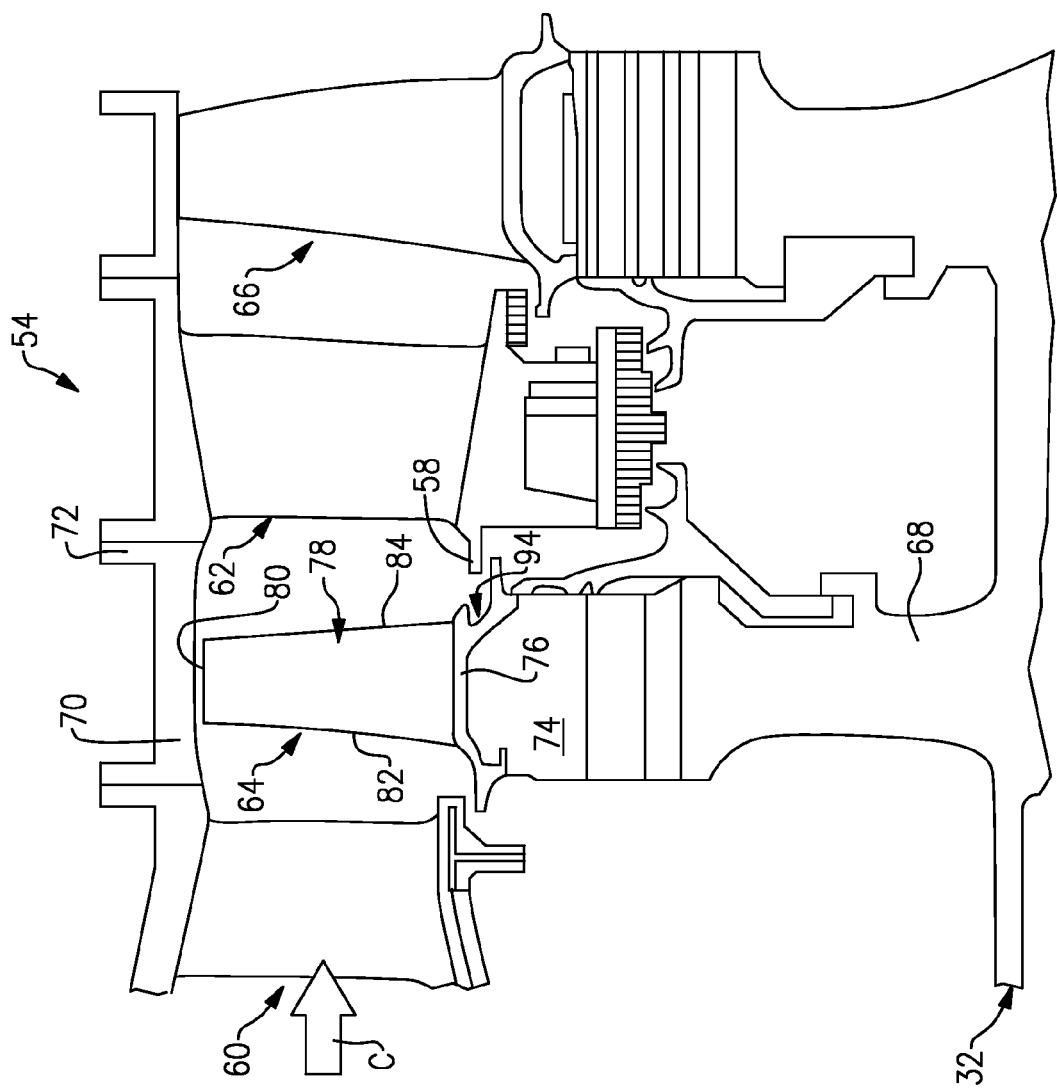
FIG. 2 is a cross-sectional view through a high pressure turbine section.

Referring to FIG. 2, a cross-sectional view through a high pressure turbine section 54 is illustrated. In the example high pressure turbine section 54, first and second fixed vane arrays 60, 62 are axially spaced apart from one another. A first stage array of turbine blades 64 is arranged axially between the first and second fixed vane arrays 60, 62. A second stage array of turbine blades 66 is arranged aft of the second fixed vane array 62. The first and second stage arrays of turbine blades 64, 66 are arranged within a core flow path C and connected to a spool 32.

Each of the arrays of turbine blades 64, 66 include a tip 80 arranged adjacent to a blade outer air seal 70 mounted to a turbine case 72. A root 74 of the turbine blade 64 is mounted to the rotor disk 68. The turbine blade 64 includes a platform 76 providing an aft-facing U-channel 94 arranged on an aft portion of the turbine blade 64. A platform 58 of the second fixed vane array 62 is arranged in an overlapping relationship with the turbine blade 64 and interleaved with the U-channel.

Figure 3A:
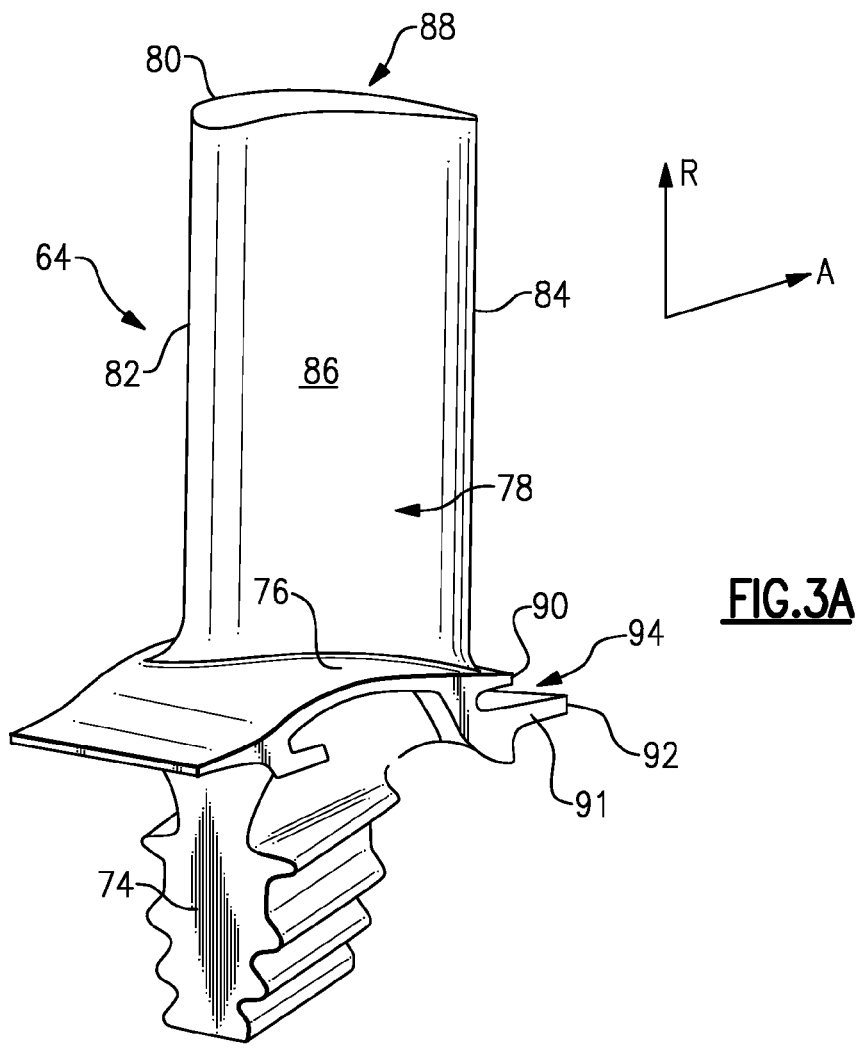
FIG. 3A is a perspective view of the airfoil having the disclosed cooling passage.

One turbine blade 64 is shown in FIG. 3A. The turbine blade 64 includes an airfoil 78 that extends radially outwardly from the platform 76 opposite the root 74 to the tip 80. While the airfoil 78 is disclosed as being part of a turbine blade 64, it should be understood that the disclosed airfoil can also be used as a vane.

Figure 3B:
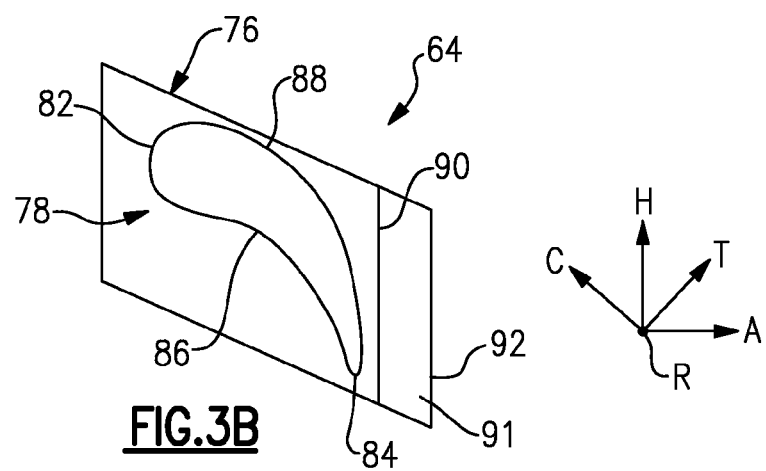
FIG. 3B is a plan view of the airfoil illustrating directional references.

Referring to FIGS. 3A and 3B, the airfoil 78 includes an exterior airfoil surface extending in a chord-wise direction C from a leading edge 82 to a trailing edge 84. The airfoil 78 is provided between pressure and suction sides 86, 88 in an airfoil thickness direction T, which is generally perpendicular to the chord-wise direction C. Multiple turbine blades 64 are arranged circumferentially in a circumferential direction H. The airfoil 78 extends from the platform 76 in a radial direction R to the tip 80. The exterior airfoil surface may include multiple film cooling holes (not shown).

Referring to FIGS. 4 and 5, the platform 76 provides a platform edge 90 at the aft side of the turbine blade 64. A lower wing 91 is arranged radially inwardly relative to the platform edge 90. The lower wing 91 provides a lower wing edge 92 that extends axially beyond the platform edge 90 relative to the trailing edge 84. The U-channel 94 is provided radially between the platform 76 and lower wing 91 to reduce the stresses in the area of the trailing edge 84. Pressure and suction side pockets 96, 98 are respectively provided on the pressure and suction sides of the turbine blade 64 on opposing lateral sides of the turbine blade 64.

Typically, multiple cooling passages 108 are provided internally within the turbine blade 64. The cooling passages 108 extend from a radially innermost end of the root 74 through the airfoil 78 toward the tip 80. A compressed air source 112 supplies cooling fluid to the cooling passages 108 to cool the blade. In one example, the compressed air source 112 is provided by mid-stage compressed air from the area between the low and high compressor sections 44, 52.

An impingement hole 102 extends from the U-channel 94 into the root 74 to fluidly connect one of the cooling passages 108 to the U-channel 94. In one example, the impingement hole 102 has a diameter of 0.010 inch to 0.075 inch (0.25 mm to 1.91 mm). The impingement hole 102 is oriented in a generally radial direction such that it directs cooling fluid onto an under side 100 of the platform 76. Referring to FIG. 6, the cooling fluid from the impingement hole 102 generates a vortex 110 within the U-channel 94 leading to improved cooling of the turbine blade 64 in the area of the U-channel 94.

Returning to FIGS. 4 and 5, first and second holes 104, 106 respectively fluidly connect the U-channel 94 to each of the pressure and suction side pockets 96, 98. The first and second holes 104, 106 may have a diameter of 0.010 inch to 0.075 inch (0.25 mm to 1.91 mm).

Although an example embodiment has been disclosed, a worker of ordinary skill in this art would recognize that certain modifications would come within the scope of the claims. For example, the turbine blade can be used in other engine configurations. For that reason, the following claims should be studied to determine their true scope and content.

What is claimed is:

1. A turbine blade for a gas turbine engine comprising:
   an airfoil including leading and trailing edges joined by spaced apart pressure and suction sides to provide an exterior airfoil surface extending in a radial direction, the trailing edge arranged on an aft side of the turbine blade;
   a root supporting a platform from which the airfoil extends, and a cooling passage extending within the root in the radial direction to the airfoil; and
   a lower wing arranged beneath the platform on the aft side and extending in an axial direction to provide a U-shaped channel with the platform that extends in a circumferential direction, and an impingement hole extending from the U-channel to the cooling passage, wherein the impingement hole is oriented generally in a radial direction, wherein the impingement hole is configured to direct fluid onto an underside of the platform.

2. The turbine blade according to claim 1, wherein the lower wing extends axially beyond the platform, and the U-channel faces aft.

3. The turbine blade according to claim 1, wherein the impingement hole has a diameter of 0.010 inch to 0.075 inch (0.25 mm to 1.91 mm).

4. The turbine blade according to claim 1, wherein the impingement hole is configured to create a vortex within the U-channel.

5. A turbine blade for a gas turbine engine comprising:
   an airfoil including leading and trailing edges joined by spaced apart pressure and suction sides to provide an exterior airfoil surface extending in a radial direction, the trailing edge arranged on an aft side of the turbine blade;
   a root supporting a platform from which the airfoil extend, and a cooling passage extending within the root in the radial direction to the airfoil, wherein the root includes laterally spaced apart pressure and suction sides respectively having a pressure and suction side pocket;
   a lower wing arranged beneath the platform on the aft side and extending in an axial direction to provide a U-shaped channel with the platform the extends in a circumferential direction, and an impingement hole extending from the U-channel to the cooling passage;
   a first hole fluidly connecting one of the pressure and suction side pockets to the U-channel; and
   a second hole fluidly connecting the U-channel to the other of the pressure and suction side pockets, wherein the first and second holes are angled toward one another and at the U-shaped channel.

6. The turbine blade according to claim 5, wherein the first hole includes a diameter of 0.010 inch to 0.075 inch (0.25 mm to 1.91 mm).

7. A method of cooling a turbine blade for a gas turbine engine, comprising the steps of:
   providing a U-channel at an aft side of a turbine blade and adjoining a platform;

supplying a cooling fluid to a cooling passage arranged internal to the turbine blade;
routing the cooling fluid to the U-channel; and
impinging the cooling fluid onto a surface of the U-channel, wherein the impinging step includes directing the cooling fluid onto an underside of the platform.

8. The method according to claim 7, wherein the impinging step creates a vortex within the U-channel.

9. The method according to claim 7, comprising the step of fluidly connecting the U-channel to a pocket arranged on a lateral side of the turbine blade.

10. The method according to claim 9, comprising the step of fluidly connecting another pocket on an opposite lateral side of the turbine blade to the U-channel.

11. The method according to claim 7, wherein the routing step includes fluidly connecting the U-channel to the cooling passage with a hole having a diameter of about 0.025 inch (0.64 mm).

12. A gas turbine engine comprising:
a compressor section;
a combustor fluidly connected to the compressor section;
a turbine section fluidly connected to the combustor, the turbine section comprising:
    a high pressure turbine coupled to the high pressure compressor via a shaft;
    a low pressure turbine; and
    wherein the high pressure turbine includes an array of turbine blades, each turbine blade includes an airfoil including leading and trailing edges joined by spaced apart pressure and suction sides to provide an exterior airfoil surface extending in a radial direction, the trailing edge arranged on an aft side of the turbine blade;
    a root supporting a platform from which the airfoil extends, and a cooling passage extending within the root in the radial direction to the airfoil; and
    a lower wing arranged beneath the platform on the aft side and extending in an axial direction to provide a U-shaped channel with the platform that extends in a circumferential direction, and an impingement hole extending from the U-channel to the cooling passage, wherein the array of turbine blades includes circumferentially adjacent blades, each of the turbine blades having a lateral side with a pocket, and including a hole fluidly connecting each pocket to the U-channel, wherein the holes are angled toward one another and at the U-shaped channel.

13. The gas turbine engine according to claim 12, wherein the compressor section is fluidly connected to the cooling passage and configured to provide a cooling fluid to the impingement hole.

14. The gas turbine engine according to claim 12, wherein the high pressure turbine includes multiple fixed vane arrays, the array of turbine blades arranged between the fixed vane arrays.

15. The gas turbine engine according to claim 14, wherein the array of turbine blades corresponds to a first stage array of turbine blades.

* * * * *